(12) United States Patent
Yamaguchi et al.

(10) Patent No.: US 9,537,380 B2
(45) Date of Patent: Jan. 3, 2017

(54) PERMANENT-MAGNET TYPE ROTATING ELECTRICAL MACHINE

(75) Inventors: Shinichi Yamaguchi, Tokyo (JP); Eigo Totoki, Tokyo (JP); Masato Ito, Tokyo (JP); Daisuke Nishijima, Tokyo (JP); Toshinori Tanaka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 363 days.

(21) Appl. No.: 14/005,429

(22) PCT Filed: Jan. 18, 2012

(86) PCT No.: PCT/JP2012/050989
§ 371 (c)(1),
(2), (4) Date: Sep. 16, 2013

(87) PCT Pub. No.: WO2012/124372
PCT Pub. Date: Sep. 20, 2012

(65) Prior Publication Data
US 2014/0001908 A1    Jan. 2, 2014

(30) Foreign Application Priority Data
Mar. 15, 2011    (JP) .................................. 2011-056677

(51) Int. Cl.
*H02K 29/12*    (2006.01)
*H02K 1/27*    (2006.01)
(Continued)

(52) U.S. Cl.
CPC ................ *H02K 29/12* (2013.01); *H02K 1/27* (2013.01); *H02P 6/183* (2013.01); *H02K 21/16* (2013.01); *H02K 29/03* (2013.01); *H02K 2213/03* (2013.01)

(58) Field of Classification Search
CPC ........ H02K 1/27; H02K 1/274; H02K 1/2746; H02K 1/276; H02K 1/24; H02K 29/06; H02K 29/12; H02K 21/16; H02K 2213/03; H02P 6/183
(Continued)

(56) References Cited

U.S. PATENT DOCUMENTS 5,408,153 A *    4/1995    Imai et al. ................... 310/68 B
8,513,850 B2 *    8/2013    Evans et al. .............. 310/156.53
(Continued)

FOREIGN PATENT DOCUMENTS

JP    2000 197292    7/2000
JP    2007318974    12/2007
(Continued)

OTHER PUBLICATIONS

Examination Report issued Jan. 24, 2014 in Taiwanese Patent Application No. 101102492 (with English translation).
(Continued)

*Primary Examiner* — Terrance Kenerly
*Assistant Examiner* — Alexander Singh
(74) *Attorney, Agent, or Firm* — Oblon, McClelland, Maier & Neustadt, L.L.P.

(57)    ABSTRACT

A permanent-magnet type rotating electrical machine, including a rotor including a plurality of magnetic poles arranged at an equal interval, and a stator including a plurality of teeth and a plurality of armature windings. A high frequency voltage different in frequency and amplitude from voltages for generating a torque is applied to the armature windings. A magnetic pole position of the rotor is estimated by using a current trajectory of a measured high frequency current. When dq transform is applied to the measured high frequency current, a current trajectory forms an ellipse on d and q axes. Angular variation ranges of a
(Continued)

major axis of the ellipse with respect to a load current and a rotor position are set so as to acquire a predetermined position estimation resolution.

3 Claims, 8 Drawing Sheets

(51) Int. Cl.
*H02P 6/18* (2016.01)
*H02K 21/16* (2006.01)
*H02K 29/03* (2006.01)

(58) Field of Classification Search
USPC .................. 310/156.05, 156.06, 156.08, 156.33, 310/156.53
See application file for complete search history.

(56) References Cited

U.S. PATENT DOCUMENTS

2003/0020358 A1* 1/2003 Masumoto et al. .......... 310/216
2010/0295403 A1 11/2010 Morita et al.

FOREIGN PATENT DOCUMENTS

| JP | 2010 11611 | 1/2010 |
| JP | 2010 193609 | 9/2010 |
| JP | 2011 4583 | 1/2011 |
| JP | 2011 10439 | 1/2011 |
| WO | WO 2009027290 A1 * | 3/2009 |

OTHER PUBLICATIONS

International Search Report Issued Apr. 17, 2012 in PCT/JP12/050989 Filed Jan. 18, 2012.

* cited by examiner

FIG. 7

| ROTOR STRUCTURE | SPM | IPM | SPM | IPM | SPM | IPM |
|---|---|---|---|---|---|---|
| NUMBER OF PERMANENT MAGNETS P | 8 | 8 | 10 | 10 | 10 | 10 |
| NUMBER OF SLOTS N | 12 | 12 | 12 | 12 | 12 | 12 |
| P/(GREATEST COMMON DIVISOR OF P AND N) | 2 | 2 | 5 | 5 | 5 | 5 |
| $La/(\pi D/N - Lb)$ | 0.12 | 0.12 | 0.12 | 0.12 | 0.9 | 0.9 |
| (1) SALIENCY RATIO OF ROTATING ELECTRICAL MACHINE CORRESPONDING TO RATIO OF MINOR AXIS TO MAJOR AXIS OF ELLIPSE REPRESENTING CURRENT TRAJECTORY IS EQUAL TO OR MORE THAN 1.06 | × | ○ | × | ○ | × | ○ |
| (2) REDUCTION OF VARIATION BETWEEN NO-LOAD STATE AND LOAD STATE OF MAJOR AXIS OF ELLIPSE REPRESENTING CURRENT TRAJECTORY | ○ | ○ | ○ | × | ○ | ○ |
| (3) REDUCTION OF VARIATION OF MAJOR AXIS OF ELLIPSE REPRESENTING CURRENT TRAJECTORY WITH RESPECT TO ROTOR POSITION | × | × | ○ | ○ | ○ | ○ |
| APPLICATION TO ROTATION-SENSOR-LESS DRIVE | × | × | × | × | × | ○ |

PERMANENT-MAGNET TYPE ROTATING ELECTRICAL MACHINE

TECHNICAL FIELD

The present invention relates to a permanent-magnet type rotating electrical machine capable of detecting a position of a rotor in a sensorless manner (capable of rotation-sensorless drive).

BACKGROUND ART

In recent years, there have been required an increase in reliability, a decrease in cost, and downsizing for a permanent-magnet type rotating electrical machine such as a permanent magnet motor. In order to meet those requirements, rotation-sensor-less drive technologies capable of dispensing with a rotation detection device for a motor such as an optical encoder or a resolver have been developed.

As one of rotation-sensor-less drive methods for the permanent-magnet type rotating electrical machine, there is proposed a high frequency superimposing method enabling estimation of magnetic pole positions of a motor even when the motor is not rotating (for example, refer to Patent Literature 1). The high frequency superimposing method involves applying a high frequency voltage independent of voltages for generating a torque to armature windings of the motor, and using a difference between a d-axis current and a q-axis current caused by a dependency of the inductance of the motor on a rotor position (saliency) to detect the position of the rotor.

Moreover, as the motor applied to the high frequency superimposing method, namely, as the motor for the rotation-sensor-less drive using the dependency of the inductance of the motor on the rotor position (saliency), an interior magnet motor having the saliency is used (for example, refer to Patent Literature 2). In the interior magnet motor, permanent magnets are embedded in a rotor iron core, and a stator iron core is integrally structured, and has an opening shape, thereby enabling detection of an initial magnetic pole position when a power supply is turned on.

CITATION LIST

Patent Literature

[PTL 1] WO 2009/040965 A1
[PTL 2] JP 2004-056871 A

SUMMARY OF INVENTION

Technical Problems

The high frequency superimposing method disclosed in Patent Literature 1 involves carrying out the detection of the position of the rotor while assuming that the permanent-magnet type rotating electrical machine has an ideal inductance distribution, specifically, an ellipsoidal trajectory drawn by the d-axis current and the q-axis current does not change depending on a load and the rotor position. However, an actual permanent-magnet type rotating electrical machine does not have the ideal inductance distribution, is thus large in estimation error of the magnetic pole position, and has such a problem that the positioning control cannot be carried out highly accurately.

Moreover, in order to realize the rotation-sensor-less drive technology capable of dispensing with the rotation detection device for a motor such as the optical encoder or the resolver, the position detection for a rotor needs to be carried out not only when the power supply is turned on but also when the motor is being driven (in a load condition where a motor load current is supplied).

In contrast, as disclosed in Patent Literature 2, if the stator iron core is integrally structured, a state of magnetic saturation inside the iron core tends to change depending on the load current of the motor. Therefore, there is also such a problem that a magnitude of the inductance of the motor changes depending on the load current, which causes an increase in the position detection error or a step-out during the sensorless drive, and the structure cannot be applied to the positioning control.

The present invention is devised to solve the above-mentioned problems, and has an object to acquire a permanent-magnet type rotating electrical machine capable of highly accurately detecting a position of a rotor during a sensorless drive.

Solution to Problems

A permanent-magnet type rotating electrical machine according to the present invention includes a rotor including a plurality of magnetic poles arranged at an equal interval, and a stator including a plurality of teeth and a plurality of armature windings. A high frequency voltage different in frequency and amplitude from voltages for generating a torque is applied to the armature windings. A magnetic pole position of the rotor is estimated by using a current trajectory of a measured high frequency current. When dq transform is applied to the measured high frequency current, a current trajectory forms an ellipse on d and q axes. Angular variation ranges of a major axis of the ellipse with respect to a load current and a rotor position are set so as to acquire a predetermined position estimation resolution.

Advantageous Effects of Invention

In the permanent-magnet type rotating electrical machine according to the present invention, when the dq transform is applied to the high frequency current measured when the high frequency voltage is applied, the current trajectory forms the ellipse on the d and q axes, and the angular variation ranges of the major axis of the ellipse with respect to the load current and the rotor position are set so as to acquire the predetermined position estimation resolution.

Accordingly, it is possible to acquire the permanent-magnet type rotating electrical machine capable of highly accurately detecting the position of the rotor during the sensorless drive.

BRIEF DESCRIPTION OF DRAWINGS

FIG. 7 is an explanatory diagram illustrating a representative example of a result of study of application of a permanent-magnet type rotating electrical machine to a rotation-sensor-less drive by means of a magnetic field analysis while shapes of a rotor and a stator are used as parameters.

DESCRIPTION OF EMBODIMENTS

Figure 1:
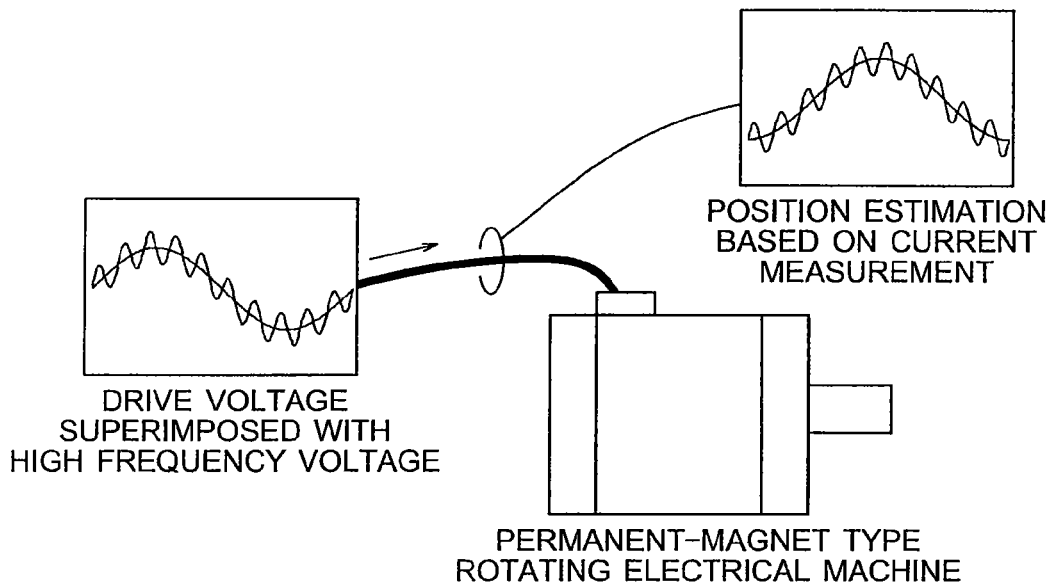
FIG. 1 is an explanatory diagram illustrating a detection method for magnetic pole positions during a sensorless drive of a general permanent-magnet type rotating electrical machine.

A description is now given of a permanent-magnet type rotating electrical machine according to preferred embodiments of the present invention referring to the drawings, in which the same or corresponding components are denoted by the same reference symbols.

First Embodiment

Referring to FIG. 1, a description is now given of a detection method for magnetic pole positions of a permanent-magnet type rotating electrical machine during a sensorless drive. FIG. 1 is a general explanatory diagram illustrating the detection method for the magnetic pole positions of the permanent-magnet type rotating electrical machine. In FIG. 1, a drive voltage for detecting magnetic pole positions, on which a high frequency voltage is superimposed, is applied to the permanent-magnet type rotating electrical machine, and magnetic pole positions are estimated by processing a current waveform of a measured current in each of phases.

Figure 2:
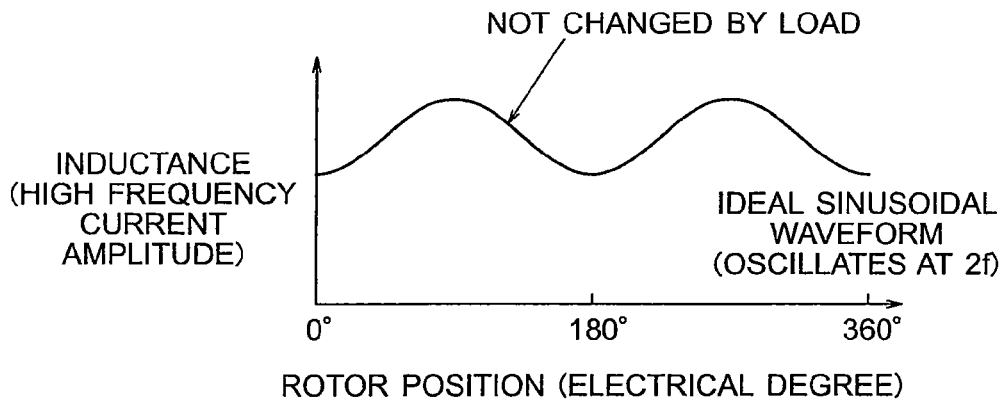
FIG. 2 is an explanatory diagram showing an ideal inductance distribution with respect to a rotor position of a permanent-magnet type rotating electrical machine.

Then, FIG. 2 shows an ideal inductance distribution with respect to a rotor position of the permanent-magnet type rotating electrical machine. In FIG. 2, the ideal inductance distribution has an ideal sinusoidal waveform having two vibration components across 360 electrical degrees, and has a shape in which neither a phase shift nor a distortion occurs even if a magnitude of a load current changes. Therefore, a current waveform with respect to the rotor position when the high frequency voltage is applied is also an ideal sinusoidal waveform having the two vibration components across 360 electrical degrees.

Figure 3:
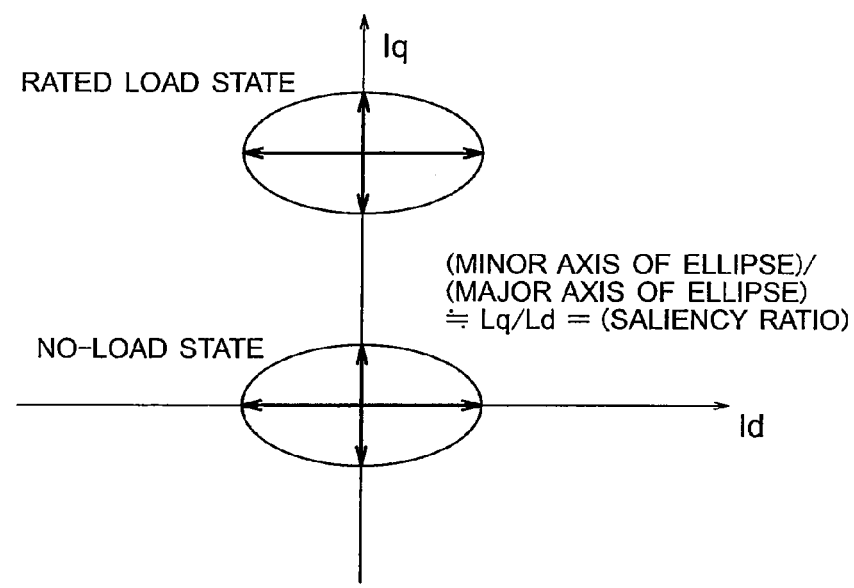
FIG. 3 is an explanatory diagram showing a current trajectory on d and q axes when a drive voltage superimposed with a high frequency voltage is applied to a permanent-magnet type rotating electrical machine having the ideal inductance distribution.

On this occasion, when the drive voltages for detecting magnetic pole positions, on which the high frequency voltage is superimposed, are applied to the permanent-magnet type rotating electrical machine having the ideal inductance distribution as shown in FIG. 2, and the measured current is coordinate-transformed in terms of the d and q axes, a current trajectory shown in FIG. 3 is acquired. In other words, the current trajectory changes depending on a variation in inductance with respect to the rotor position, and thus forms an ellipsoidal trajectory with respect to the d and q axes. It should be noted that, in FIG. 3, a ratio of the minor axis to the major axis of the ellipse represents a saliency ratio.

Further, in the permanent-magnet type rotating electrical machine having the ideal inductance distribution, neither the phase shift nor the distortion occurs in the inductance distribution due to the load current, and thus, when the load current is supplied, there is drawn an ellipsoidal trajectory shifted in the q axis direction, which is a drive current direction. After the offset processing for the q-axis current corresponding to the drive current is applied, the current trajectories are the same ellipsoidal trajectories both in a no-load state and a load state.

Note that, as described above, an actual permanent-magnet type rotating electrical machine does not have the ideal inductance distribution, and is thus so large in estimation error of the magnetic pole position that positioning control cannot be carried out highly accurately. Then, FIG. 4 shows an actual inductance distribution acquired as a result of an investigation into the rotor position of the actual permanent-magnet type rotating electrical machine.

Figure 4:
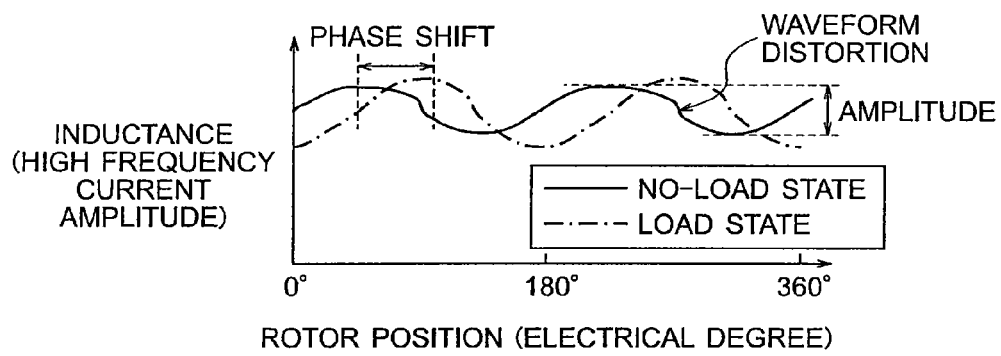
FIG. 4 is an explanatory diagram showing an actual inductance distribution with respect to the rotor position of an actual permanent-magnet type rotating electrical machine.

In FIG. 4, the actual inductance distribution includes the high frequency component (distortion component), and it is thus understood that the actual inductance distribution has a shape different from the ideal sinusoidal waveform, and the amplitude of the inductance distribution decreases depending on the magnitude of the supplied current to cause the phase shift.

Figure 5:
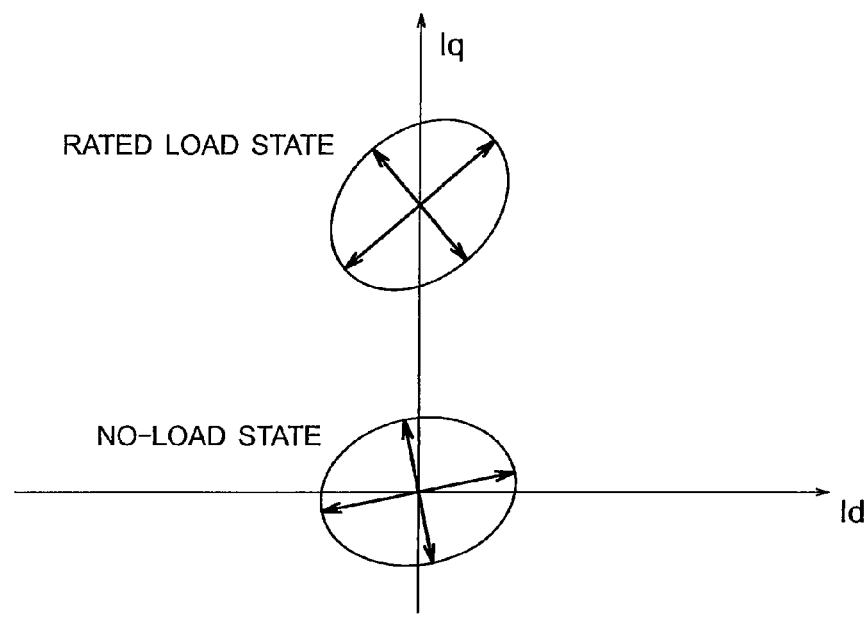
FIG. 5 is an explanatory diagram illustrating a current trajectory on the d and q axes when the drive voltages on which a high frequency voltage is superimposed are applied to the permanent-magnet type rotating electrical machine having the actual inductance distribution.

Further, if the inductance distribution with respect to the rotor position of the permanent-magnet type rotating electrical machine is generated as shown in FIG. 4, and the measured high frequency current is coordinate-transformed in terms of the d and q axes, the current trajectory is generated as shown in FIG. 5. In other words, the current trajectory of the high frequency current changes depending on a variation in inductance, and thus forms an ellipsoidal trajectory with respect to the d and q axes.

Figure 6:
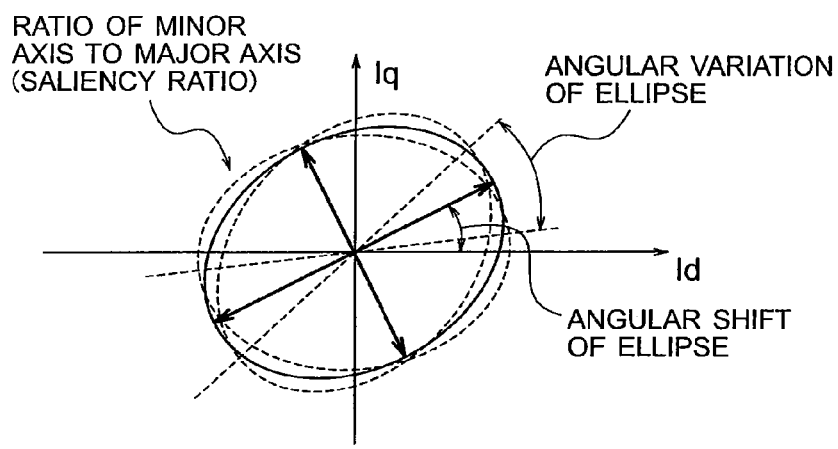
FIG. 6 is an explanatory diagram illustrating a current trajectory after offset processing for DC components of a d-axis current and a q-axis current is applied to the current trajectory on the d and q axes when the drive voltages on which the high frequency voltage is superimposed are applied to the permanent-magnet type rotating electrical machine having the actual inductance distribution.

Moreover, FIG. 6 shows a current trajectory after the offset processing corresponding to the drive current in order to focus on the change in the ellipsoidal shape due to the load current. From FIG. 6, it is understood that the inductance does not have a sinusoidal waveform in the actual permanent-magnet type rotating electrical machine, the ellipse is tilted (the major axis of the ellipse rotates) even in the no-load state, and the gradient of the ellipse further changes in the load state. As a result, an error is large when the magnetic pole positions are estimated in the actual permanent-magnet type rotating electrical machine, and the positioning control cannot be carried out highly accurately.

On this occasion, in a permanent-magnet type rotating electrical machine in which the high frequency voltage different in frequency and amplitude from the voltages for generating the torque is applied to armature windings to estimate magnetic pole positions of the rotor by using the current trajectory of the high frequency current, in order to highly accurately estimate the magnetic pole positions to carry out the highly accurate positioning control, the inductance distribution needs to be the ideal sinusoidal distribution independent of the load current and the rotor position.

However, the actual inductance distribution does not have the sinusoidal waveform and the phase sift occurs by a load, and thus it is hard to generate the inductance distribution in the perfect sinusoidal waveform. Thus, according to the first embodiment of the present invention, based on the above-mentioned sensorless drive theory, motor performance conditions (current response conditions) required for the rotation-sensor-less drive were clarified.

In other words, as a result of magnetic field analysis for the permanent-magnet type rotating electrical machine and simulation for the rotation-sensor-less drive, it was found that the following conditions 1 to 3 need to be simultaneously satisfied as current response conditions required for the rotation-sensor-less drive.

Specifically, when a high frequency voltage different in frequency and amplitude from the voltages for generating a torque is applied to the armature windings, and the measured high frequency current is dq-transformed, the current trajectory has the ellipsoidal shape on the d and q axes (condition 1), an angular variation range of the major axis of the ellipse with respect to the load current is reduced so as to acquire a predetermined position estimation resolution (condition 2), and an angular variation range of the major axis of the ellipse with respect to the rotor position is reduced so as to acquire the predetermined position estimation resolution (condition 3).

First, the condition 1 (the current trajectory of the high frequency current on the d and q axes has an ellipsoidal shape) depends on a performance of a current sensor to be used, but, considering that an error of a normal sensor is approximately ±3%, a ratio of the minor axis to the major axis of the ellipse (saliency ratio of the motor) needs to be equal to or more than 6%.

On this occasion, if the ratio of the minor axis to the major axis of the ellipse (saliency ratio of the motor) is 5% or less, in the worst case, a difference in current on the d and q axes becomes inconspicuous in an error, and the position estimation may not be carried out. Forming the current trajectory in the ellipsoidal shape means that the inductance distribution includes a fundamental wave component, and corresponds to such a condition that the permanent-magnet type rotating electrical machine has saliency.

Then, regarding the condition 2 (reduction of the angular variation range of the major axis of the ellipse with respect to the load current), as a result of the magnetic field analysis for the permanent-magnet type rotating electrical machine and the simulation for the rotation-sensor-less drive, it was found that the angular variation range by the load current is proportional to the number of pole pairs of the motor, and inversely proportional to the resolution of the magnetic pole position detection and a torque ripple rate of the motor.

When the gradient angle of the ellipse is changed by the load current, a correction corresponding to the variation is carried out by means of control. For example, if a difference in the amount of change in gradient angle of the ellipse between the no-load state and a rated load state is L degrees, the correction amount $\Delta\theta$ of the gradient of the ellipse is represented as $\Delta\theta = L \times$ q-axis current.

On the other hand, on the permanent-magnet type rotating electrical machine, even if the sinusoidal current is supplied, presence of a harmonic component of an induced voltage causes generation of a torque ripple. Therefore, even if a load torque is constant, if there is a torque ripple, a current component for compensating for the torque ripple component is superimposed on the q-axis current in order to carry out constant speed control.

For example, for a permanent-magnet type rotating electrical machine having a torque ripple of a ripple width B ($\pm B/2$), the q-axis current also has the variation of $\pm B/2$ during the constant speed control, resulting in a position error. Thus, the position error needs to be set so as to fall within the range of a magnetic pole position detection resolution A, and a condition for the setting can be represented by Equation (1).

$$H \times B/2 \leq 360/A \times \text{number of pole pairs} \quad (1)$$

Thus, a variation range H of the gradient of the ellipse between the no-load state and the rated load state required for acquiring the target magnetic pole position detection resolution A needs to have a value represented by Equation (2).

$$H \leq 360/A \times \text{number of pole pairs}/B/2 = 360/A/B \times \text{number of magnetic poles} \quad (2)$$

The above description assumes that the correction is carried out in proportion to the magnitude of the q-axis current. However, the magnitude of a control gain also has influence on the correction, and if the control gain cannot sufficiently be increased, the correction cannot be carried out. As a result, there has been a case where the target magnetic pole position detection resolution cannot be acquired in the variation range H satisfying Equation (2). In accordance with a result of past study by the inventors of the present invention, the variation range of the gradient of the ellipse between the no-load state and the rated load state for a general correction gain needs to be approximately equal to or less than 1/3 of Equation (2).

Then, regarding the condition 3 (reduction of the angular variation range of the major axis of the ellipse with respect to the rotor position), as a result of the magnetic field analysis for the permanent-magnet type rotating electrical machine and the simulation for the rotation-sensor-less drive, it was found that the angular variation range of the rotor position is proportional to the number of pole pairs of the motor, and inversely proportional to the resolution of the magnetic pole position detection. When the variation range of the major axis of the current trajectory ellipse with respect to the rotor position is S degrees, Equation (3) is satisfied.

$$A \leq 360/S/2 \times \text{number of pole pairs} \quad (3)$$

Thus, in order to acquire the target magnetic pole position detection resolution A, the variation range S of the major axis of the current trajectory ellipse with respect to the rotor position needs to have a value represented by Equation (4).

$$S \le 360/2 \times \text{number of pole pairs}/A = 360/A \times \text{number of magnetic poles} \quad (4)$$

Current response conditions of the motor suitable for the rotation-sensor-less drive have been described, and if the target resolution of the rotation-sensor-less drive is equal to or more than 200 pulses/rotation, the torque ripple range of the motor is 0.1 (10%), and the number of pole pairs is 5, specific current response conditions are represented as described below. In other words, the motor needs to be designed so that the variation range H of the gradient of the ellipse between the no-load state and the rated load state satisfies $H \le 360/200/0.1 \times 5/3 = 30$ degrees, and the variation range S of the major axis of the current trajectory ellipse with respect to the rotor position satisfies $S \le 360/200 \times 5 = 9$ degrees.

On this occasion, in the design of the permanent-magnet type rotating electrical machine, while magnetic structures intended to increase the torque and to decrease a cogging torque and the torque ripple are diligently studied, magnetic structures for reducing the variations caused by the load current and the rotor position by causing the inductance distribution to be closer to the sinusoidal waveform are hardly studied.

Particularly, the inductance distribution becomes a non-sinusoidal waveform due to generation of higher harmonic wave components caused by magnetic saturation and the slots, and thus a magnetic structure for optimizing the inductance distribution has been unknown. Thus, a permanent-magnet type rotating electrical machine which simultaneously satisfies all the conditions 1 to 3 and is suitable for the rotation-sensor-less drive was studied in terms of the shapes of the rotor and the stator by means of the magnetic analysis. FIG. 7 illustrates a representative example of a result of the magnetic analysis.

From FIG. 7, it is understood that an IPM structure needs to be selected to satisfy the condition 1. On the other hand, it is understood that an SPM structure having 10 poles and 12 slots may be selected to satisfy the conditions 2 and 3. However, the SPM structure cannot ensure the saliency defined in the condition 1, and cannot thus be applied to the rotation-sensor-less drive.

Then, in addition to the rotor structure and the numbers of poles and slots, a slot opening ratio is also focused on, and magnetic field analysis was carried out. As a result, it was found that a permanent-magnet type rotating electrical machine simultaneously satisfying all the conditions 1 to 3 needs to have the IPM structure, 10 poles, 12 slots, and a slot opening ratio of equal to or more than 0.6. A detailed description is now given of a structure of the permanent-magnet type rotating electrical machine according to the first embodiment of the present invention.

Figure 8:
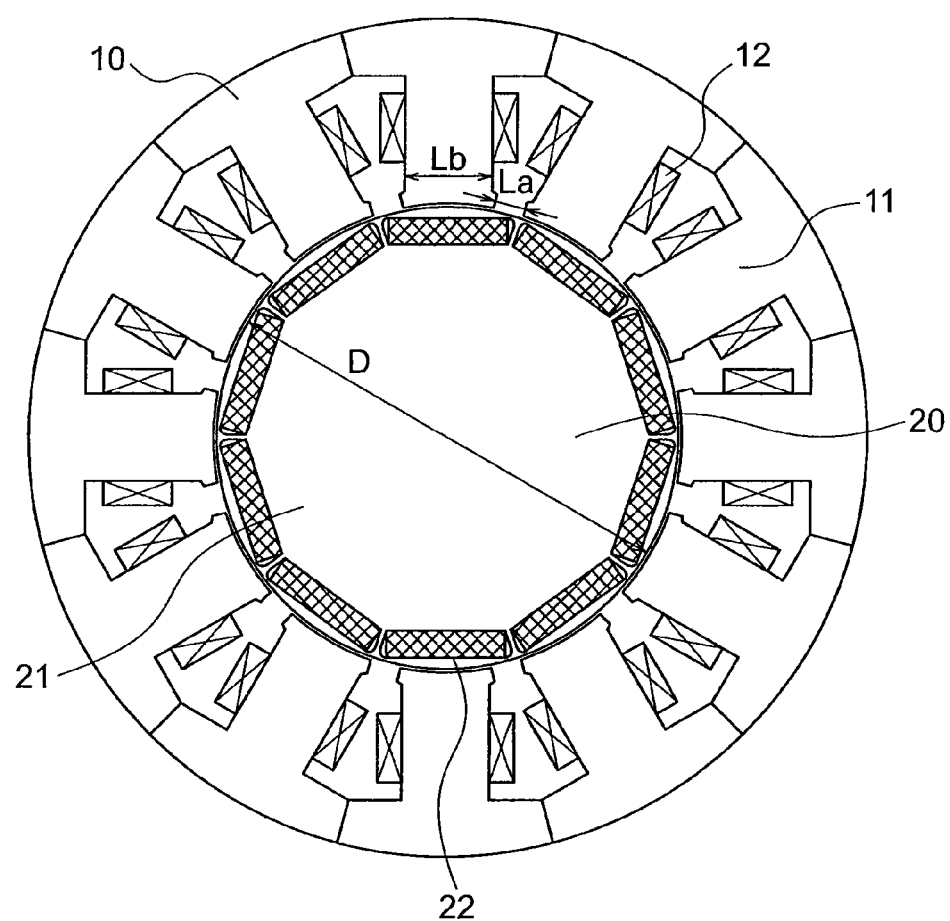
FIG. 8 is a cross sectional view illustrating a structure of a permanent-magnet type rotating electrical machine according to a first embodiment of the present invention.

FIG. 8 is a cross sectional view illustrating a structure of the permanent-magnet type rotating electrical machine according to the first embodiment of the present invention. In FIG. 8, the permanent-magnet type rotating electrical machine includes a stator 10 and a rotor 20. The stator 10 includes a stator iron core 11 and armature windings 12, and the rotor 20 includes a rotor iron core 21 and permanent magnets 22. On this occasion, the permanent magnets 22 are inserted into 10 holes provided inside an outer peripheral surface of the rotor iron core 21 in the peripheral direction at an equal interval.

The stator iron core 11 having cylindrical teeth on which armature windings 12 for generating rotating magnetic fields to rotate the rotor 20 are provided is divided into N of stator blocks in the peripheral direction. On this occasion, when a gap in the peripheral direction between peripherally neighboring distal ends of the stator iron core 11 is represented as La, a size of the tooth in the peripheral direction is represented as Lb, and an inner diameter dimension of the stator iron core 11 is represented as D, the gap La in the peripheral direction between the distal ends of the stator iron core 11 is set so as to satisfy Equation (5).

$$0.6 < La/(\pi D/N - Lb) < 1.0 \quad (5)$$

Figure 9:
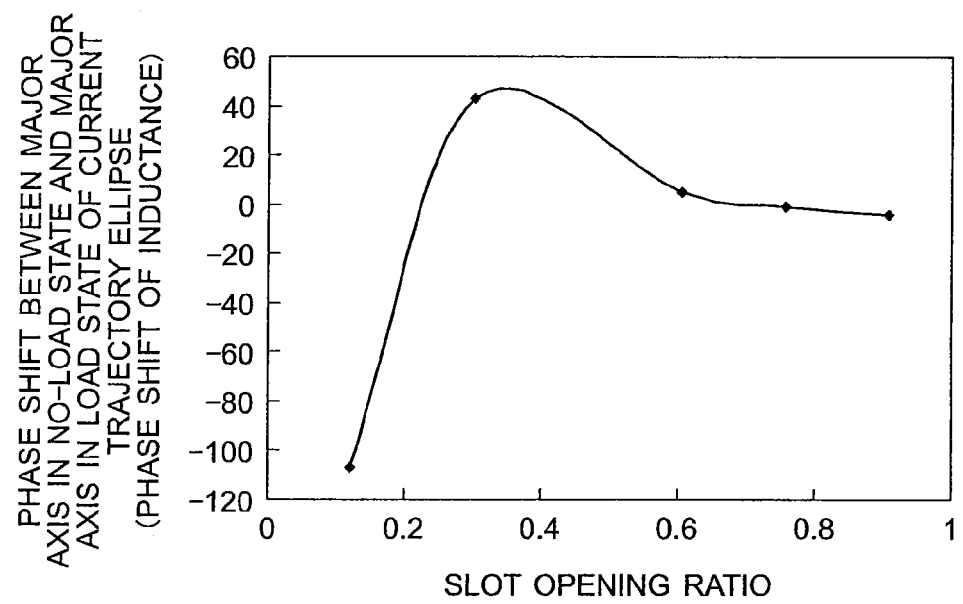
FIG. 9 is an explanatory diagram showing a relationship between a slot opening ratio and a phase shift between a major axis in a no-load state and a major axis in a load state of a current trajectory ellipse in the permanent-magnet type rotating electrical machine according to the first embodiment of the present invention.
Figure 10:
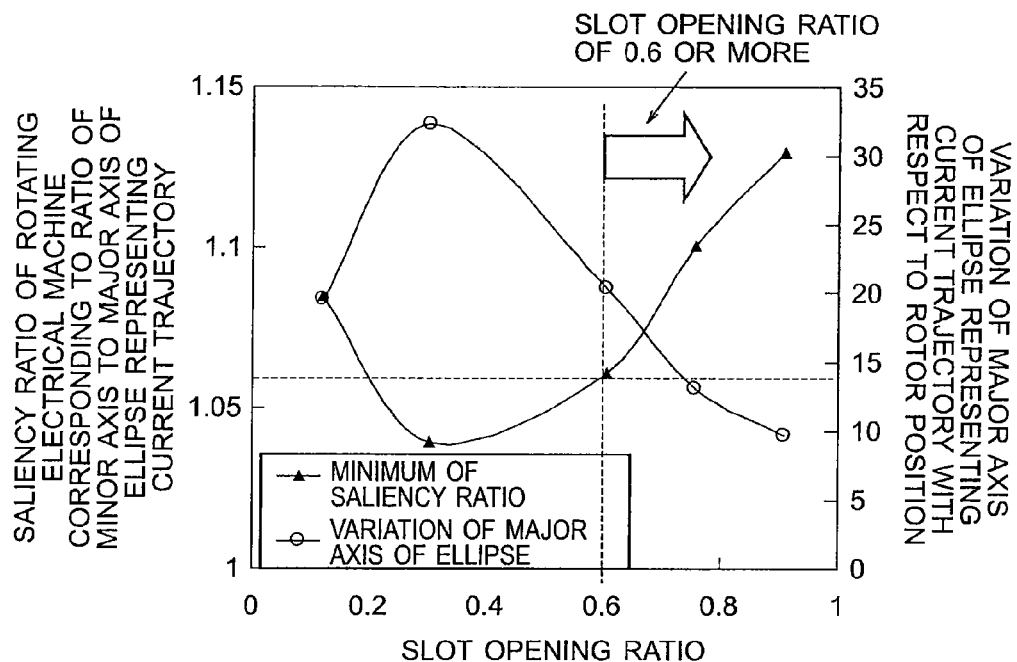
FIG. 10 is an explanatory diagram showing a relationship between the slot opening ratio and a saliency ratio of the rotating electrical machine corresponding to a ratio of a minor axis to the major axis of the ellipse of the current trajectory, and a relationship between the slot opening ratio and a variation of the major axis of the current trajectory ellipse with respect to the rotor position in the permanent-magnet type rotating electrical machine according to the first embodiment of the present invention.

On this occasion, FIG. 9 shows a relationship calculated by the magnetic field analysis between the slot opening ratio and a phase shift (phase shift in inductance) between the major axis in the no-load state and the major axis in the load state of the current trajectory ellipse. Moreover, FIG. 10 shows a calculated relationship between the slot opening ratio and the saliency ratio of the rotating electrical machine corresponding to a ratio of the minor axis to the major axis of the ellipse of the current trajectory, and a calculated relationship between the slot opening ratio and the variation of the major axis of the current trajectory ellipse with respect to the rotor position. It should be noted that the slot opening ratio is a value represented by Equation (6).

$$La/(\pi D/N - Lb) \quad (6)$$

From FIGS. 9 and 10, it is understood that an optimal slot opening ratio is equal to or more than 0.6 in order to reduce the phase shift between the major axis in the no-load state and the major axis in the load state of the current trajectory ellipse and to reduce the variation of the major axis of the current trajectory ellipse with respect to the rotor position, while securing the ratio of the minor axis to the major axis of the ellipse of the current trajectory to be equal to or more than 1.06. This is because a slot leaking flux can be reduced by increasing the slot opening ratio, and thus a change in a state of a magnetic saturation inside the stator iron core 11 caused by the load current and the rotor position can be restrained.

On this occasion, the lower limit value of the slot opening ratio is set to 0.6, but an even larger slot opening ratio can increase the ratio of the minor axis to the major axis of the ellipse of the current trajectory, can reduce the phase shift between the major axis in the no-load state and the major axis in the load state of the current trajectory ellipse, and can reduce the variation of the major axis of the current trajectory ellipse with respect to the rotor position. Therefore, as the slot opening ratio approaches 1.0, the motor becomes more suitable for the rotation-sensor-less drive.

Further, the size Lb of the tooth in the peripheral direction is set to satisfy Equation (7) when D is the inner diameter dimension of the stator iron core 11, and N is the number of divisions in the peripheral direction of the stator blocks.

$$0.57 \ge Lb/(\pi D/N) \quad (7)$$

Figure 11:
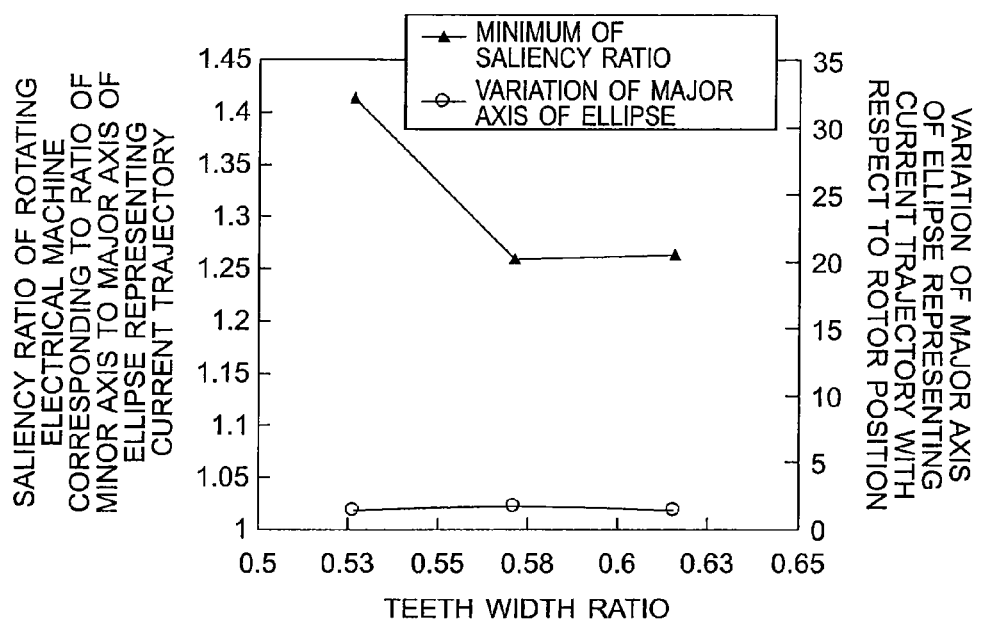
FIG. 11 is an explanatory diagram illustrating a relationship between a teeth width ratio and the saliency ratio of the rotating electrical machine corresponding to the ratio of the minor axis to the major axis of the ellipse of the current trajectory, and a relationship between the teeth width ratio and the variation of the major axis of the current trajectory ellipse with respect to the rotor position in the permanent-magnet type rotating electrical machine according to the first embodiment of the present invention.

On this occasion, FIG. 11 shows a relationship between a teeth width ratio and the saliency ratio of the rotating electrical machine corresponding to the ratio of the minor axis to the major axis of the ellipse of the current trajectory, and a relationship between the teeth width ratio and the variation of the major axis of the current trajectory ellipse with respect to the rotor position, which are calculated by the magnetic field analysis. It should be noted that the teeth width ratio is a value represented by Equation (8).

$$Lb/(\pi D/N) \quad (8)$$

From FIG. 11, it is understood that even if the teeth width ratio changes, the variation of the major axis of the current trajectory ellipse with respect to the rotor position hardly changes, but the ratio of the minor axis to the major axis of the ellipse of the current trajectory abruptly increases at a point where the teeth width ratio becomes equal to or less than 0.57. This is because the reduction in the teeth width ratio can restrain the change in state of the magnetic saturation inside the rotor iron core 11 caused by the load current and the rotor position, and it is understood that as the teeth width ratio decreases, the motor becomes more suitable for the rotation-sensor-less drive.

Moreover, a machining distortion and a residual stress are generated by punching in the iron core, and magnetic characteristics thus degrade. Therefore, according to the first embodiment of the present invention, the stator iron core 11 is divided in the peripheral direction to degrade even the magnetic characteristics at divided portions of the stator 10, thereby magnetically saturate the iron core stably. This configuration can also restrain the change in the state of the magnetic saturation inside the stator iron core 11 due to the load current and the rotor position.

As described above, the stable magnetic saturation of the iron core can restrain the change in the state of the magnetic saturation inside the stator iron core 11, can reduce the phase shift between the major axis in the no-load state and the major axis in the load state of the current trajectory ellipse, and can reduce the variation of the major axis of the current trajectory ellipse with respect to the rotor position.

Moreover, when P is the number of magnetic poles of the permanent-magnet type rotating electrical machine and N is the number of slots, P and N are set so that P/(greatest common divisor of P and N) is an odd number. As a result, the variation of the major axis of the current trajectory ellipse with respect to the rotor position can be reduced. Moreover, electrolytic corrosion of a bearing can be mentioned as a failure factor of the permanent-magnet type rotating electrical machine, but the above-mentioned setting of P and N can avoid generation of a voltage on a shaft, which makes the motor more suitable for the rotation-sensor-less drive. Moreover, the position dependency of the inductance can be reduced.

As described above, according to the first embodiment, in the case where the high frequency current measured when the high frequency voltage is applied is dq-transformed, the current trajectory forms the ellipsoidal shape on the d and q axes, and the angular variation ranges of the major axis of the ellipse with respect to the load current and the rotor position are set so that the predetermined position estimation resolution is acquired.

Therefore, a permanent-magnet type rotating electrical machine on which the position of the rotor can be detected highly accurately during the sensorless drive can be provided.

Second Embodiment

Figure 12:
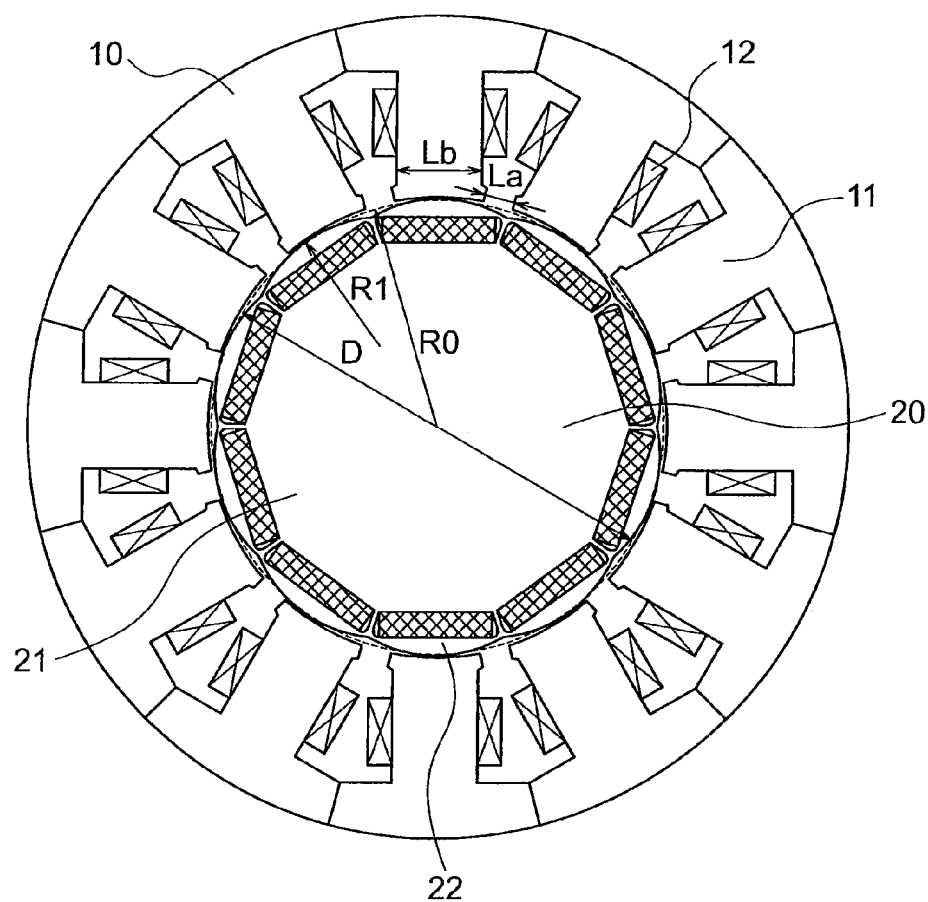
FIG. 12 is a cross sectional view illustrating a structure of a permanent-magnet type rotating electrical machine according to a second embodiment of the present invention.

FIG. 12 is a cross sectional view illustrating a structure of a permanent-magnet type rotating electrical machine according to a second embodiment of the present invention. In FIG. 12, when R0 is an outer radius of the rotor 20, and R1 is a radius of curvature of a surface of the rotor 20, R0 and R1 are set so that R0>R1 is satisfied.

As a result, a magneto motive force of a high frequency magnetic flux of the rotor 20 can be reduced, and the variation of the major axis of the current trajectory ellipse with respect to the rotor position can be reduced. According to the second embodiment of the present invention, compared with the rotor shape according to the first embodiment having the relationship of R0=R1, the variation of the major axis of the current trajectory ellipse with respect to the rotor position can be reduced by approximately 75%. Moreover, the position dependency of the inductance can be further reduced.

The permanent-magnet type rotating electrical machines according to the first and second embodiments enable the estimation of the magnetic pole position without a rotation detection device for the motor such as the optical encoder or the resolver. Therefore, the number of components and failure factors can be reduced. As a result, a high reliability and a low cost can be achieved. It should be noted that the optical encoder and the resolver can be used in combination.

REFERENCE SIGNS LIST 10 stator
11 stator iron core
12 armature winding
20 rotor
21 rotor iron core
22 permanent magnet

The invention claimed is:

1. A permanent-magnet type rotating electrical machine, comprising:
   a rotor including a plurality of magnetic poles arranged at an equal interval; and
   a stator including a plurality of teeth and a plurality of armature windings, wherein:
   the rotor includes permanent magnets inserted into P holes provided inside an outer peripheral surface of a rotor iron core in a peripheral direction at an equal interval;
   the stator includes a stator iron core having N teeth and having a cylindrical shape on which the plurality of armature windings for generating a rotating magnetic field to rotate the rotor are provided, the stator iron core being divided into N stator blocks in the peripheral direction; and
   a setting is made so that $0.6 < La/(\pi D/N - Lb) < 1.0$ is satisfied, where La is a gap in the peripheral direction between distal end portions of the stator iron core neighboring each other in the peripheral direction, Lb is a size of each of the plurality of teeth in the peripheral direction, and D is an inner diameter dimension of the stator iron core, and P and N are set so that P/(greatest common divisor of P and N) is an odd number; and
   the size Lb of the each of the plurality of teeth of the stator in the peripheral direction is set so that $0.57 \geq Lb/(\pi D/N)$ is satisfied;
   wherein positioning control is carried out without using a rotation detection device, and
   wherein the position of the rotor is detected in a state that the stator iron core is stably magnetically saturated and positioning control is carried out without using a rotation detection device.

2. A permanent-magnet type rotating electrical machine according to claim 1, wherein R0 and R1 are set so that R0>R1 is satisfied, where R0 is an outer radius of the rotor, and R1 is a radius of curvature of a surface of the rotor.

3. A permanent-magnet type rotating electrical machine according to claim 1,
   wherein the ratio of the minor axis to the major axis of the ellipse in the current trajectory on d and q axes caused by an applied high frequency voltage when the positioning control is executed is set to be equal to or more than 6%.

* * * * *